US010540972B2

(12) United States Patent
Nakagome et al.

(10) Patent No.: US 10,540,972 B2
(45) Date of Patent: Jan. 21, 2020

(54) SPEECH RECOGNITION DEVICE, SPEECH RECOGNITION METHOD, NON-TRANSITORY RECORDING MEDIUM, AND ROBOT

(71) Applicant: CASIO COMPUTER CO., LTD., Tokyo (JP)

(72) Inventors: Kouichi Nakagome, Tokorozawa (JP); Takashi Yamaya, Fussa (JP); Keisuke Shimada, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 15/884,741

(22) Filed: Jan. 31, 2018

(65) Prior Publication Data

US 2018/0277111 A1    Sep. 27, 2018

(30) Foreign Application Priority Data

Mar. 27, 2017 (JP) .................................. 2017-061357

(51) Int. Cl.
*G10L 15/22* (2006.01)
*G10L 15/02* (2006.01)
(Continued)

(52) U.S. Cl.
CPC ............ *G10L 15/22* (2013.01); *G05D 1/0255* (2013.01); *G10L 15/02* (2013.01); *G10L 25/51* (2013.01);
(Continued)

(58) Field of Classification Search
CPC ......... G10L 15/22; G10L 15/02; G10L 25/51; G10L 25/78; G10L 15/14;
(Continued)

(56) References Cited

U.S. PATENT DOCUMENTS

2004/0054531 A1*  3/2004  Asano ..................... G10L 15/20
                                                                704/231
2004/0141418 A1*  7/2004  Matsuo ................... G01S 11/14
                                                                367/124

FOREIGN PATENT DOCUMENTS

JP    H10-143190 A    5/1998
JP    H11-161292 A    6/1999
(Continued)

OTHER PUBLICATIONS

Notice of Reasons for Refusal dated Sep. 10, 2019 in Japanese Patent Application No. 2017-061357.

*Primary Examiner* — Sonia L Gay
(74) *Attorney, Agent, or Firm* — Scully Scott Murphy & Presser

(57) ABSTRACT

A feature extractor extracts feature quantities from a digitized speech signal and outputs the feature quantities to a likelihood calculator. A distance determiner determines the distance between a user providing speech and a speech input unit. The likelihood calculator selects registered expressions for speech recognition from a recognition target table based on the determined distance, to be used in calculation of likelihoods at the likelihood calculator. The likelihood calculator calculates likelihoods for the selected registered expressions based on the feature quantities extracted by the feature extractor, and outputs one of the registered expressions having the maximum likelihood as a result of speech recognition.

20 Claims, 16 Drawing Sheets

(51) Int. Cl.
*G10L 25/51* (2013.01)
*G10L 25/78* (2013.01)
*G10L 15/14* (2006.01)
*G05D 1/02* (2006.01)

(52) U.S. Cl.
CPC .............. *G10L 25/78* (2013.01); *G10L 15/14* (2013.01); *G10L 2015/223* (2013.01); *Y10S 901/01* (2013.01)

(58) Field of Classification Search
CPC ........ G10L 2015/223; G10L 2015/226; G05D 1/0255; Y10S 901/01
See application file for complete search history.

(56) References Cited

FOREIGN PATENT DOCUMENTS

| | | |
|---|---|---|
| JP | 2004-226656 A | 8/2004 |
| JP | 2005-335001 A | 12/2005 |
| JP | 2008-064892 A | 3/2008 |
| JP | 2013-072904 A | 4/2013 |
| JP | 2013-257418 A | 12/2013 |

* cited by examiner

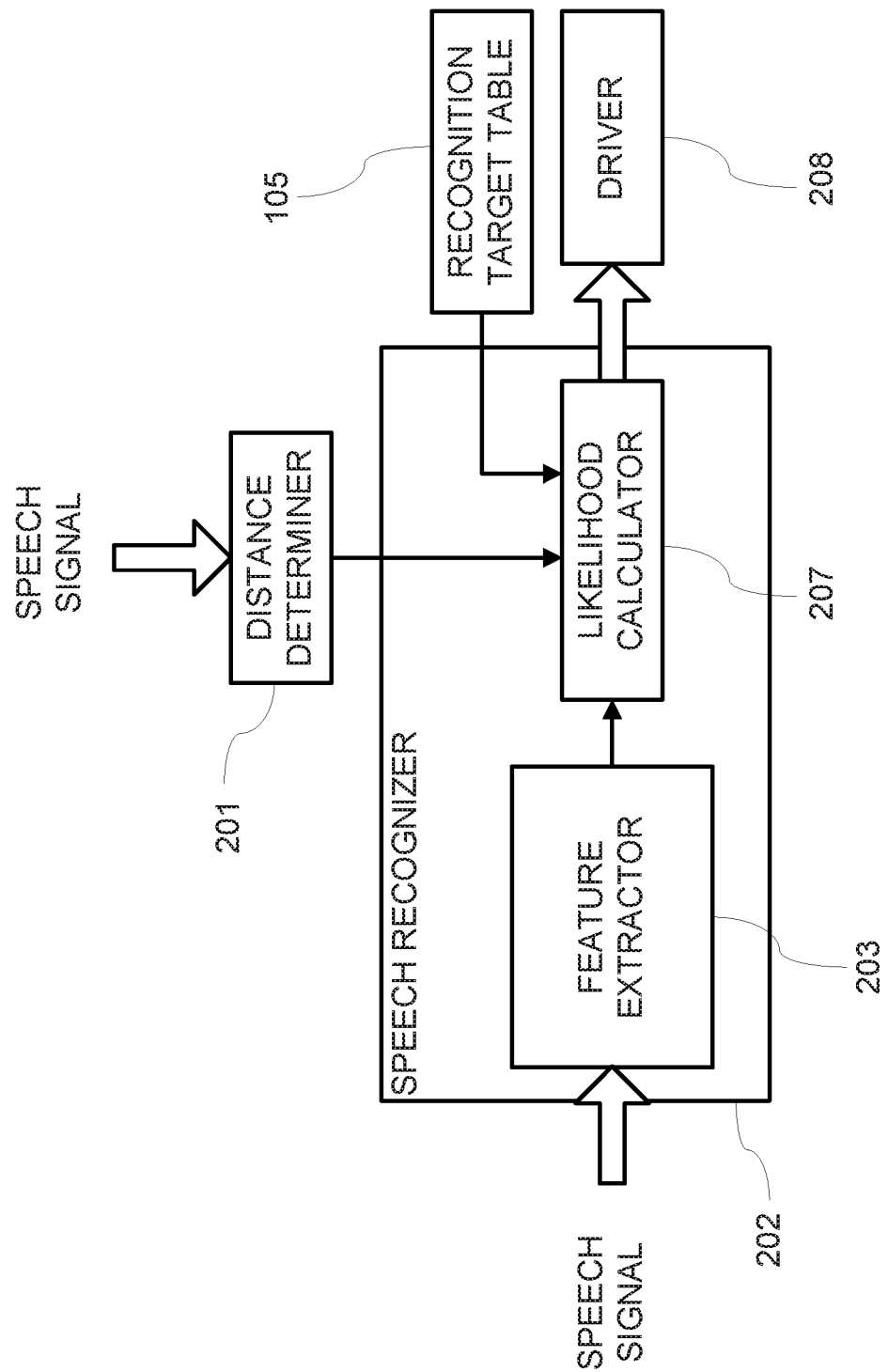

FIG. 4A

REGISTERED EXPRESSIONS AND DISTANCE PARAMETERS IN RECOGNITION

| DISTANCE | REGISTERED EXPRESSION |
|---|---|
| LONGER THAN 10.0 | (NO SPEECH RECOGNITION) |
| 5.0 TO 10.0 | Yoo-hoo; (NAME OF ROBOT 1); Come to me |
| 1.5 TO 5.0 | Hey; Can you hear me?; Wait; Look at me |
| 0.5 TO 1.5 | Tell me the weather; Turn on the light; Is the battery remaining?; What's the news today?.... |
| 0 TO 0.5 | (USE ALL EXPRESSIONS) |

FIG. 4B

REGISTERED EXPRESSIONS AND ACOUSTIC MODELS IN RECOGNITION

| REGISTERED EXPRESSION | ACOUSTIC MODEL |
|---|---|
| Yoo-hoo | |
| ... | ... |

FIG. 6

RESPONSE DATA TABLE 106

| RECOGNITION RESULT | OPERATION |
|---|---|
| Yoo-hoo | DRIVE MOTORS IN NECK JOINT TO ROTATE; DRIVE SPEAKER TO OUTPUT RESPONSE |
| Come to me | DRIVE MOTOR IN LEGS TO APPROACH SPEECH SOURCE |
| ... | ... |

FIG. 13

RECOGNITION TARGET EXCLUSION TABLE 107

| DISTANCE | EXPRESSION |
|---|---|
| 0.2 | Come to me; Come on; Can you hear me? ... |

FIG. 14A

REGISTERED EXPRESSIONS CLASSIFIED INTO GROUPS

| GROUP | REGISTERED EXPRESSIONS |
|---|---|
| SHORT DISTANCE | (EXPRESSIONS FOR SPECIFIC CONVERSATIONS) |
| INTERMEDIATE DISTANCE | Tell me the weather; Turn on the light; Look at me .... |
| ALL DISTANCES | Yoo-hoo; (NAME OF ROBOT) ... |
| NOT VERY CLOSE | Come to me; Come on; Can you hear me? ... |

FIG. 14B

WEIGHTING PARAMETERS FOR GROUPS

| GROUP | $0 \leq L < 0.2$ | $0.2 \leq L < 1.0$ | $1.0 \leq L < 5.0$ | $5.0 \leq L < 10.0$ |
|---|---|---|---|---|
| SHORT DISTANCE | 2 | 1 | 0.3 | 0.1 |
| INTERMEDIATE DISTANCE | 2 | 2 | 1 | 0.3 |
| ALL DISTANCES | 1 | 1 | 1 | 1 |
| NOT VERY CLOSE | 0.1 | 1 | 1 | 1 |

*FIG. 16*

DISTANCE PARAMETERS AND CORRESPONDING SPEECH RECOGNITION ENGINES

| DISTANCE | SPEECH RECOGNITION ENGINE |
|---|---|
| 1.5 TO 10.0 | ENGINE FOR WORDS |
| 0 TO 1.5 | ENGINE FOR PHRASES |

# SPEECH RECOGNITION DEVICE, SPEECH RECOGNITION METHOD, NON-TRANSITORY RECORDING MEDIUM, AND ROBOT

CROSS-REFERENCE TO RELATED APPLICATION

This application claims the benefit of Japanese Patent Application No. 2017-061357, filed on Mar. 27, 2017, the entire disclosure of which is incorporated by reference herein.

FIELD

This application relates to a speech recognition device, a speech recognition method, a non-transitory recording medium, and a robot.

BACKGROUND

In typical speech recognition, the rate of false recognition may increase due to a high level of background noise and the like. In order to avoid this problem, improved speech recognition techniques have been accomplished, such as one disclosed in Unexamined Japanese Patent Application Kokai Publication No. H11-161292. This technique uses a plurality of standard patterns for each segment of speech to be recognized. Input speech is evaluated with scores for the respective standard patterns and then recognized based on the scores. The scores are varied depending on the level of background noise. This speech recognition technique leads to a reduction in the rate of false recognition due to background noise.

SUMMARY

A speech recognition device according to one aspect of the disclosure includes: a distance determiner that determines a distance to a speech source; a speech recognizer that recognizes a speech signal; and a recognizable registered expression specifier that varies registered expressions recognizable by the speech recognizer based on the distance determined by the distance determiner.

A speech recognition method according to another aspect of the disclosure includes: determining a distance to a speech source in a distance determination step; and recognizing a speech signal in a speech recognition step. In the speech recognition step, the speech signal is recognized using registered expressions associated with the distance determined in the distance determination step.

A non-transitory computer-readable recording medium according to another aspect of the disclosure has stored thereon a program executable by a computer. The program controls the computer to perform functions including: determining a distance to a speech source in a distance determination step; and recognizing a speech signal in a speech recognition step. In the speech recognition step, the program controls the computer to recognize the speech signal using registered expressions associated with the distance determined in the distance determination step.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 3 is a block diagram of the robot serving as a speech recognition device according to Embodiment 1 of the disclosure;

FIG. 4A illustrates registered expressions and distance parameters in a recognition target table according to Embodiment 1 of the disclosure;

FIG. 4B illustrates registered expressions and acoustic models in the recognition target table according to Embodiment 1 of the disclosure;

FIG. 6 is a response data table according to Embodiment 1 of the disclosure;

FIG. 13 is a recognition target exclusion table used in a speech recognition device according to Embodiment 2 of the disclosure;

FIG. 14A illustrates registered expressions classified into groups in a recognition target table used in a speech recognition device according to Embodiment 3 of the disclosure;

FIG. 14B illustrates weighting parameters associated with distance ranges for each group in the recognition target table used in the speech recognition device according to Embodiment 3 of the disclosure;

FIG. 16 illustrates an exemplary speech recognition program capable of switching speech recognition engines based on the distance.

DETAILED DESCRIPTION

A speech recognition device, a speech recognition method, and a robot operating under the commands input through the device or by the method according to embodiments of the disclosure will now be described with reference to the accompanying drawings.

(Embodiment 1)

Figure 1:
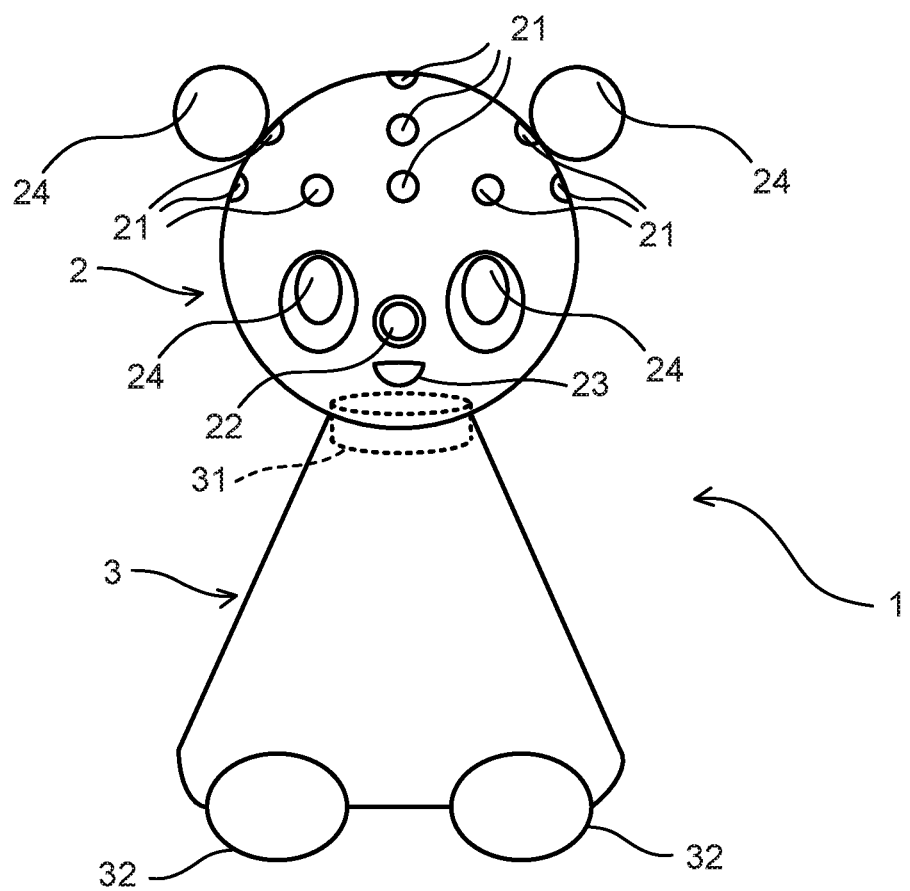
FIG. 1 illustrates the appearance of a robot according to Embodiment 1 of the disclosure.

FIG. 1 is a front view of the appearance of a robot 1 according to Embodiment 1.

The robot 1 moves in a house and talks with residences of the house, for example. Alternatively, the robot 1 moves in an event site and responds to inquiries from visitors to provide the visitors with spoken information on the event and guide the visitors.

The robot 1 is capable of speech recognition. In specific, the robot 1 recognizes speech input from a user, and uses the speech as a command to execute an operation corresponding to the command With reference to FIG. 1, the robot 1 includes a head 2 and a body 3.

The head 2 of the robot 1 includes microphones 21, a camera 22, a speaker 23, and sensors 24.

The microphones 21 are disposed in a plurality of positions and constitute an array microphone. The microphones 21 function as a speech input unit for receiving environmental sound.

The camera 22 is disposed in the position of the nose, and takes an image under the control of a controller 100 (described below).

The speaker 23 is disposed in the position of the mouth, and outputs various voices under the control of the controller 100 (described below).

The sensors 24 are disposed in the respective positions of the eyes and ears. The sensors 24 include a range finder, an acceleration sensor, and an obstacle sensor to detect various physical values.

The head 2 and the body 3 are connected to each other with a neck joint 31 illustrated with the dashed lines. The neck joint 31 includes motors, which are driven by the controller 100 (described below) to rotate the head 2 of the robot 1 in the pitch, roll, and yaw directions.

The bottom of the body 3 is provided with legs 32 including wheels and a drive motor. The wheels include two front wheels and two rear wheels. Examples of the wheels include omni wheels and Mecanum wheels. The controller 100 (described below) drives the motor to rotate the wheels and thereby move the robot 1.

The hardware configuration of the robot 1 will now be described with reference to FIG. 2.

Figure 2:
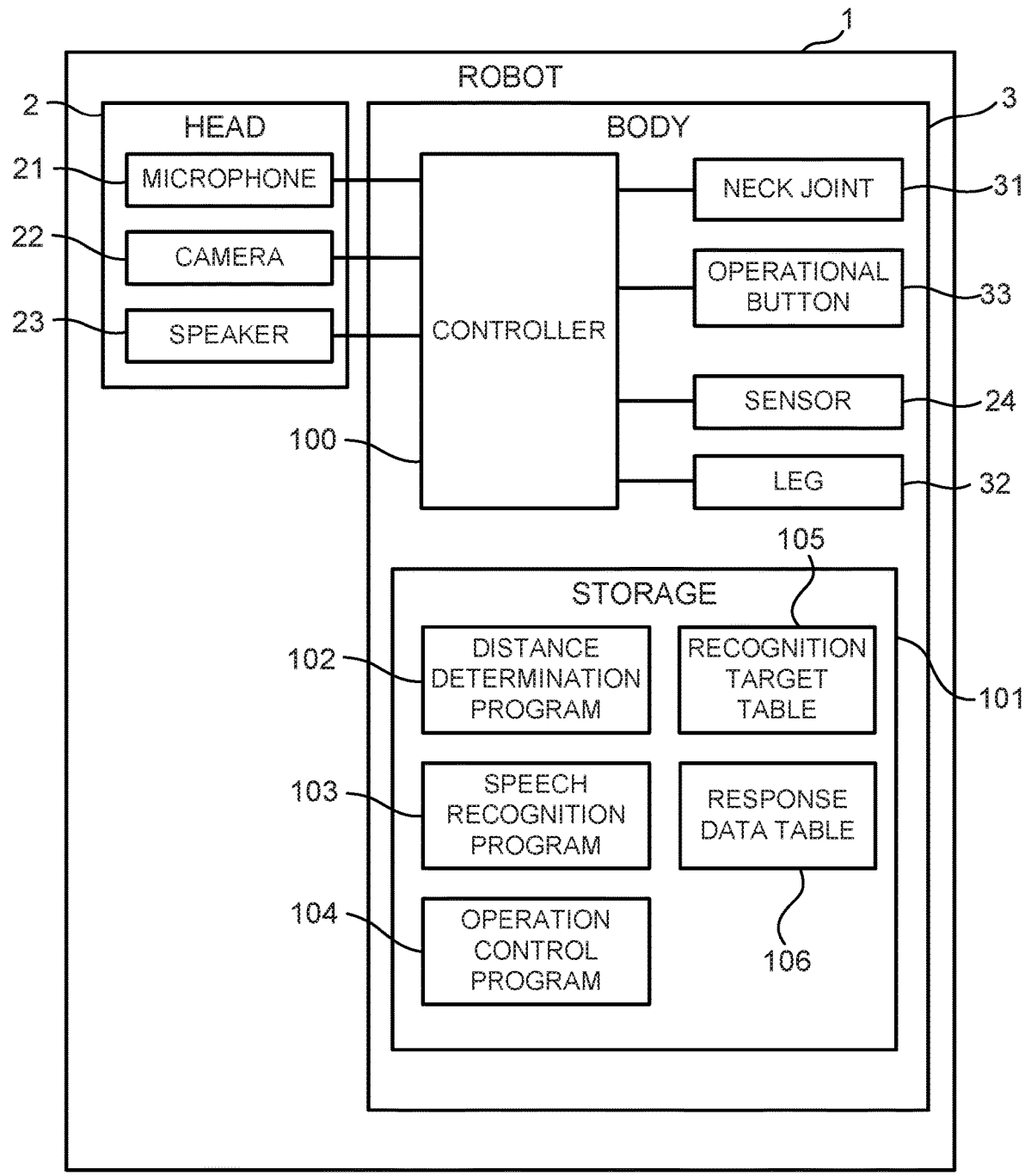
FIG. 2 illustrates the hardware configuration of the robot according to Embodiment 1 of the disclosure.

As illustrated in FIG. 2, the robot 1 further includes operational buttons 33, a storage 101, and a controller 100 in addition to the above-described microphones 21, camera 22, speaker 23, sensors 24, neck joint 31, and legs 32.

The operational buttons 33 are disposed on the back of the body 3 to be manipulated by the user. The operational buttons 33 include a power button and a volume control button.

The storage 101 includes a flash memory and stores programs to be executed by the controller 100 (described below) and various data. In specific, the storage 101 stores a distance determination program 102, a speech recognition program 103, an operation control program 104, a recognition target table 105, and a response data table 106.

The distance determination program 102 is designed to acquire the direction and distance of a speech source from a speech signal obtained at the microphones 21 based on, for example, the multiple signal classification (MUSIC) algorism for finding a wave source. In this embodiment, the speech source is the user of the robot 1.

The speech recognition program 103 is designed to recognize the speech signal obtained at the microphones 21 with reference to the recognition target table 105, and convert the signal into text data. The text data corresponding to a result of speech recognition is used as a command for controlling the robot 1. The speech recognition program 103 also involves a characteristic process in which the effective range of the recognition target table 105, that is, the number of recognizable registered expressions is reduced as the distance to the speech source increases. The details of this speech recognition process will be explained later with reference to FIG. 9.

The operation control program 104 is designed to refer to the response data table 106, select an operation associated with the text data corresponding to the recognition result output from the speech recognition program 103, and cause the speaker 23 and the motors in the neck joint 31 and the legs 32 to perform the operation, so that the robot 1 responds to the speech of the user.

The recognition target table 105 functions as a recognizable registered expression specifier that varies registered expressions recognizable in the speech recognition program 103 based on the distance to the speech source. In specific, the recognition target table 105 defines recognizable registered expressions to be recognized in the speech recognition program 103 for each distance range. The recognizable registered expressions are each defined in a unit of speech recognition and include not only words (in the smallest grammatical unit) but also phrases and sentences. With reference to FIG. 4A, each registered expression is associated with any range of distance to the speech source. As the distance to the speech source increases, the number of recognizable registered expressions gradually decreases whereas the number of unrecognizable registered expressions increases. In the example illustrated in FIG. 4A, for example, if the distance L to the speech source is longer than 10 m, the number of recognizable registered expressions is set to 0 and no speech recognition is performed. For a distance L to the speech source longer than 5.0 m and equal to or shorter than 10 m, only the three registered expressions ("Yoo-hoo," "the name of the robot 1," and "Come to me") can be recognized. For a distance L to the speech source longer than 1.5 m and equal to or shorter than 5.0 m, the total seven registered expressions can be recognized, which include the four expressions, such as "Hey," associated with this distance range and the three expressions, such as "Yoo-hoo," associated with the distance range longer than 5.0 m and equal to or shorter than 10 m. In the same manner, for a distance L to the speech source equal to or shorter than 0.5 m, all the registered expressions can be recognized.

Viewed from another aspect, the recognition target table 105 defines a recognizable range of registered expressions such that a set of recognizable registered expressions associated with a first distance to the speech source is included in a set of recognizable registered expressions associated with a distance to the speech source shorter than the first distance.

In other words, the recognition target table 105 is designed to vary the registered expressions for speech recognition in the speech recognition program 103 based on the distance to the speech source. That is, in the recognition target table 105, as the distance to the speech source increases, the number of registered expressions for speech recognition in the speech recognition program 103 decreases. That is, the recognition target table 105 is designed to adjust the easiness of recognition of each registered expression for speech recognition in the speech recognition program 103 based on the distance to the speech source.

Figure 5:
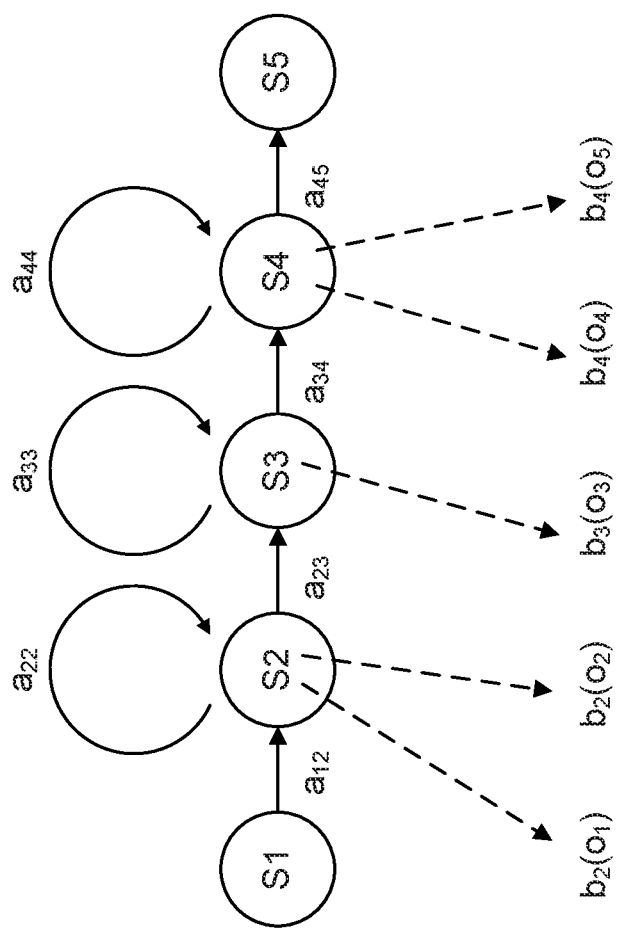
FIG. 5 illustrates an exemplary acoustic model (hidden Markov model; HMM) used in the speech recognition device according to Embodiment 1 of the disclosure.

With reference to FIG. 4B, the recognition target table 105 associates each of the registered expressions with data on the acoustic model of the expression. The acoustic model is assumed to be the hidden Markov model (HMM) in this example. As illustrated in FIG. 5, the HMM is a well-known model representing the possibility of transition of speech from a state into a subsequent state. In FIG. 5, $S_i$ indicates each state, $a_{ij}$ indicates the probability of transition from a state $S_i$ to a state $S_j$, $o_t$ indicates a feature vector to be output with a certain probability at a state transition, and $b_j(o_t)$ indicates the probability of output of $o_t$ at the transition to the state $S_j$, where i, j, and t are each a natural number. These parameters in the acoustic model are determined through preliminary speech learning of registered expressions.

As illustrated in FIG. 6, the response data table 106 (refer to FIG. 2) associates results of speech recognition in the speech recognition program 103 with operations to be executed by the controller 100 in response to the respective recognition results. It should be noted that a recognition result is any of the expressions registered as recognition targets in the recognition target table 105.

The controller 100 includes a processor and a random access memory (RAM) and is connected to each of the above-described components of the robot 1. The controller 100 executes the distance determination program 102, the speech recognition program 103, and the operation control program 104 stored in the storage 101, and thereby processes speech data input from the microphones 21. In addition, the controller 100 drives the speaker 23 and the motors in the neck joint 31 and the legs 32 so that the robot 1 responds to the speech or performs a responding operation. The details of the operations of the controller 100 will be explained later.

The controller 100 executes the distance determination program 102, the speech recognition program 103, and the operation control program 104 stored in the storage 101, and thereby performs functions of a distance determiner 201, a speech recognizer 202, and a driver 208 illustrated in FIG. 3.

The distance determiner 201 processes a speech signal input from the microphones 21 to determine the distance between the robot 1 and the speech source. The distance determiner 201 then outputs distance data indicating the determined distance to a likelihood calculator 207 in the speech recognizer 202. This function is performed by the distance determination program 102 and the controller 100.

The speech recognizer 202 includes a feature extractor 203 and the likelihood calculator 207. The feature extractor 203 extracts feature quantities from the speech signal stored in an internal RAM, and then outputs the extracted feature quantities in the form of a feature vector sequence to the likelihood calculator 207.

The likelihood calculator 207 executes speech recognition based on the feature vector sequence input from the feature extractor 203, the distance data input from the distance determiner 201, and the registered expressions in the recognition target table 105, and then outputs a recognition result. In detail, the likelihood calculator 207 i) specifies registered expressions as recognition targets among all the registered expressions in the recognition target table 105 based on the distance to the speech source indicated by the distance data; ii) compares the feature vector sequence input from the feature extractor 203 with the acoustic data on the specified registered expressions; iii) acquires the likelihoods for the respective registered expressions based on the comparison; and iv) outputs one of the registered expressions that has the maximum likelihood equal to or higher than a threshold as the recognition result. These functions of the speech recognizer 202 are performed by the speech recognition program 103 and the controller 100.

The driver 208 refers to the response data table 106 and controls the operation corresponding to the recognition result input from the speech recognizer 202 by using the recognition result as a command The driver 208 thus causes the robot 1 to output a voice, turns, or runs to the user. The function of the driver 208 is performed by the operation control program 104 and the controller 100.

The operations of the robot 1 having the above-described configuration will now be explained.

The operations of the robot 1 can be roughly classified into four steps: i) reception and storage of speech input from a user; ii) acquisition of the distance to the user based on the stored speech data; iii) recognition of the speech data with the limitation of recognizable registered expressions based on the acquired distance; and iv) operation corresponding to the recognition result.

Each of these steps will now be explained in sequence.

First, the operations of the robot 1 to receive and store speech input from the user will be explained.

Figure 7:
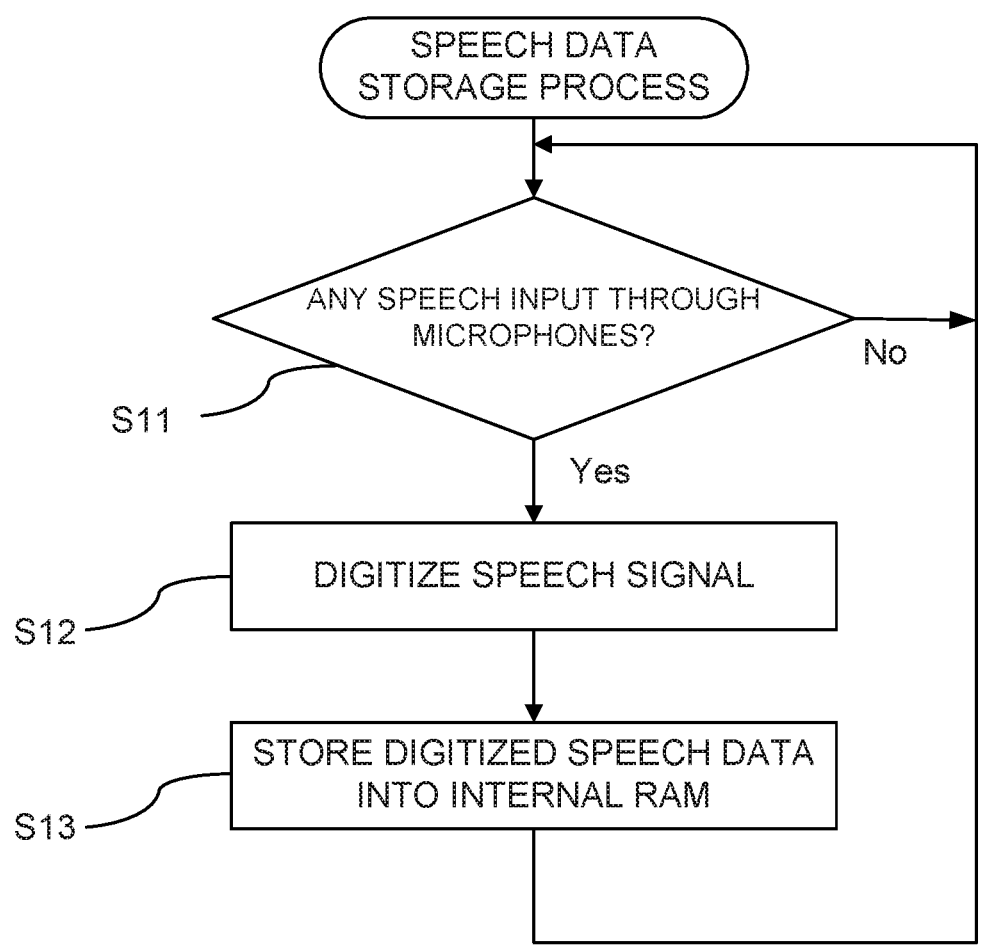
FIG. 7 is a flowchart of a speech data storage process according to Embodiment 1 of the disclosure.

The controller 100 continuously executes a speech data storage process illustrated in FIG. 7 during the power-on state.

At the start of the process, the controller 100 determines whether any speech has been input through the microphones 21 (Step S11). If determining no speech input (Step S11: No), the controller 100 returns to Step S11.

In contrast, if determining any speech input (Step S11: Yes), the controller 100 digitizes the speech signals input from all the microphones 21 (Step S12), stores the digitized speech signals into the internal RAM (Step S13), and then returns to Step S11. The segments of speech input from the user are thus sequentially stored into the internal RAM in the form of digitized speech signals.

Figure 8:
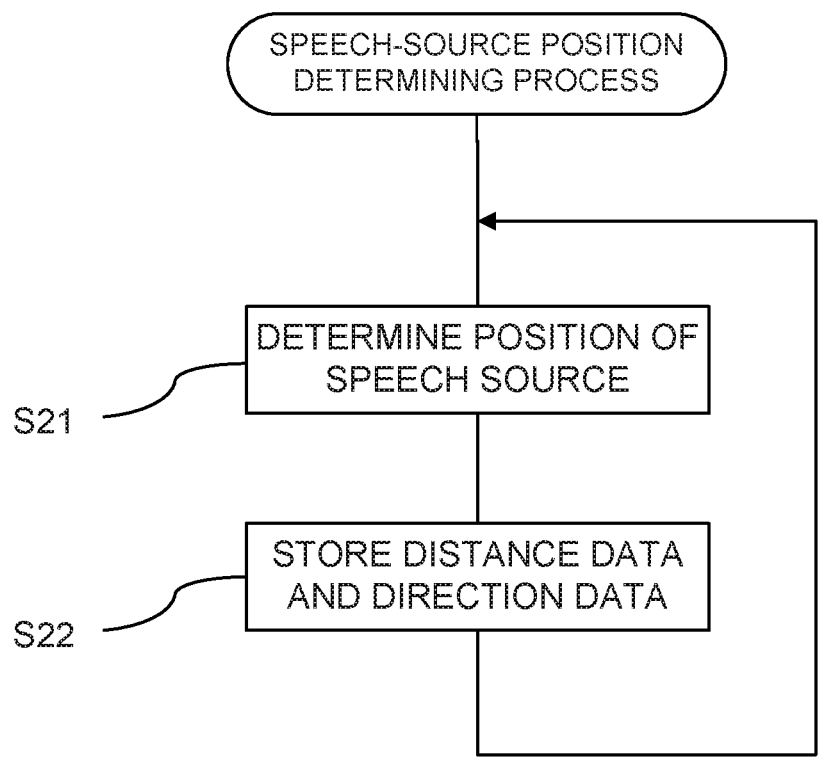
FIG. 8 is a flowchart of a speech-source position determining process according to Embodiment 1 of the disclosure.

The distance determiner 201 of the controller 100 continuously executes a speech-source position determining process illustrated in FIG. 8 during the power-on state.

At the start of the process, the distance determiner 201 processes the speech data, which was obtained at the microphones 21 and stored in the internal RAM, using the MUSIC algorism for finding the speech source, and thus determines the position of the user (Step S21).

The distance determiner 201 stores distance data indicating the distance to the determined position and direction data indicating the direction to the position into the internal RAM (Step S22), and then returns to Step S21.

Figure 9:
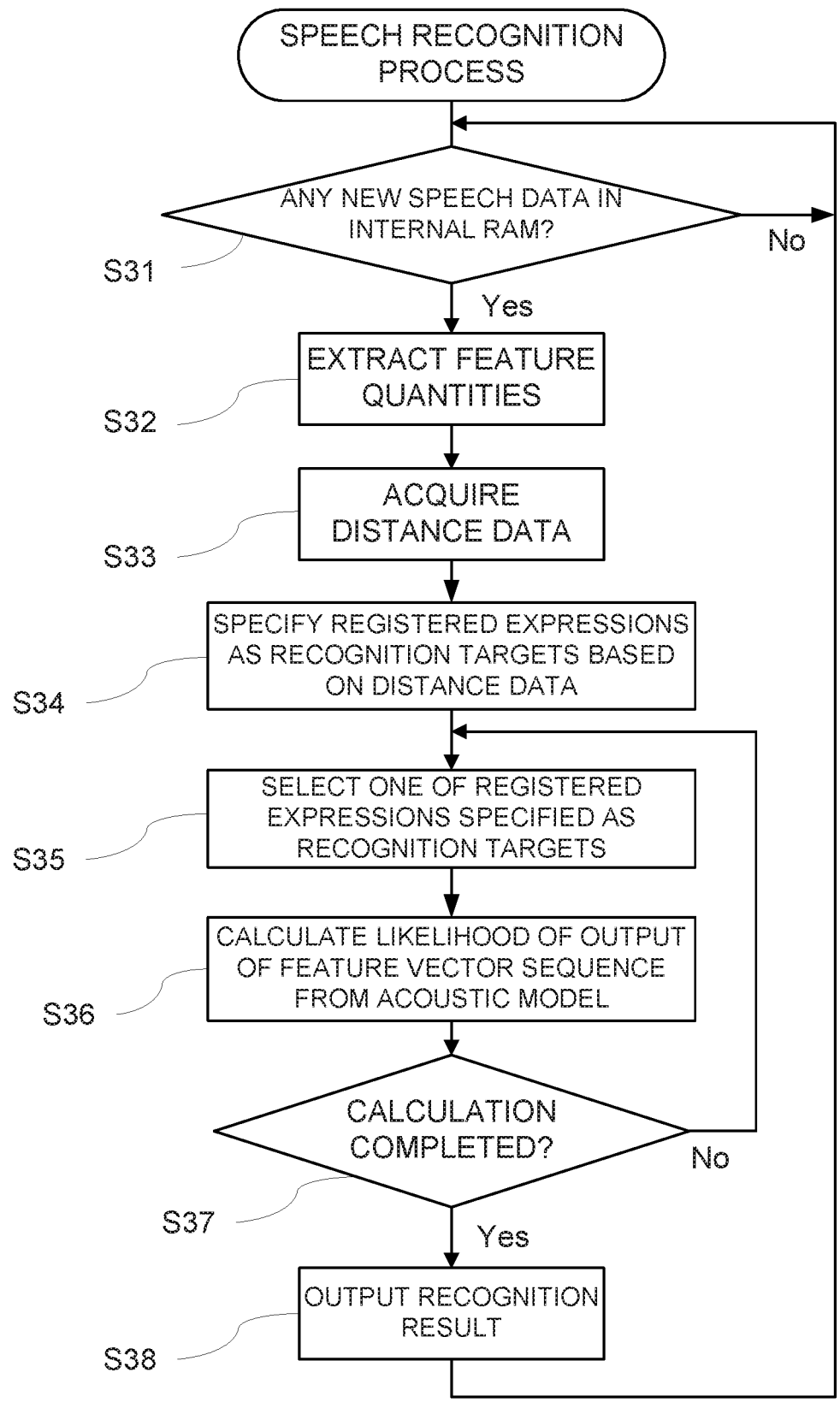
FIG. 9 is a flowchart of a speech recognition process according to Embodiment 1 of the disclosure.

Furthermore, the speech recognizer 202 of the controller 100 continuously executes the speech recognition process illustrated in FIG. 9 during the power-on state.

At the start of the process, the speech recognizer 202 determines whether any new speech data is stored in the internal RAM (Step S31). If determining no storage of new speech data (Step S31: No), the speech recognizer 202 returns to Step S31.

Figure 11:
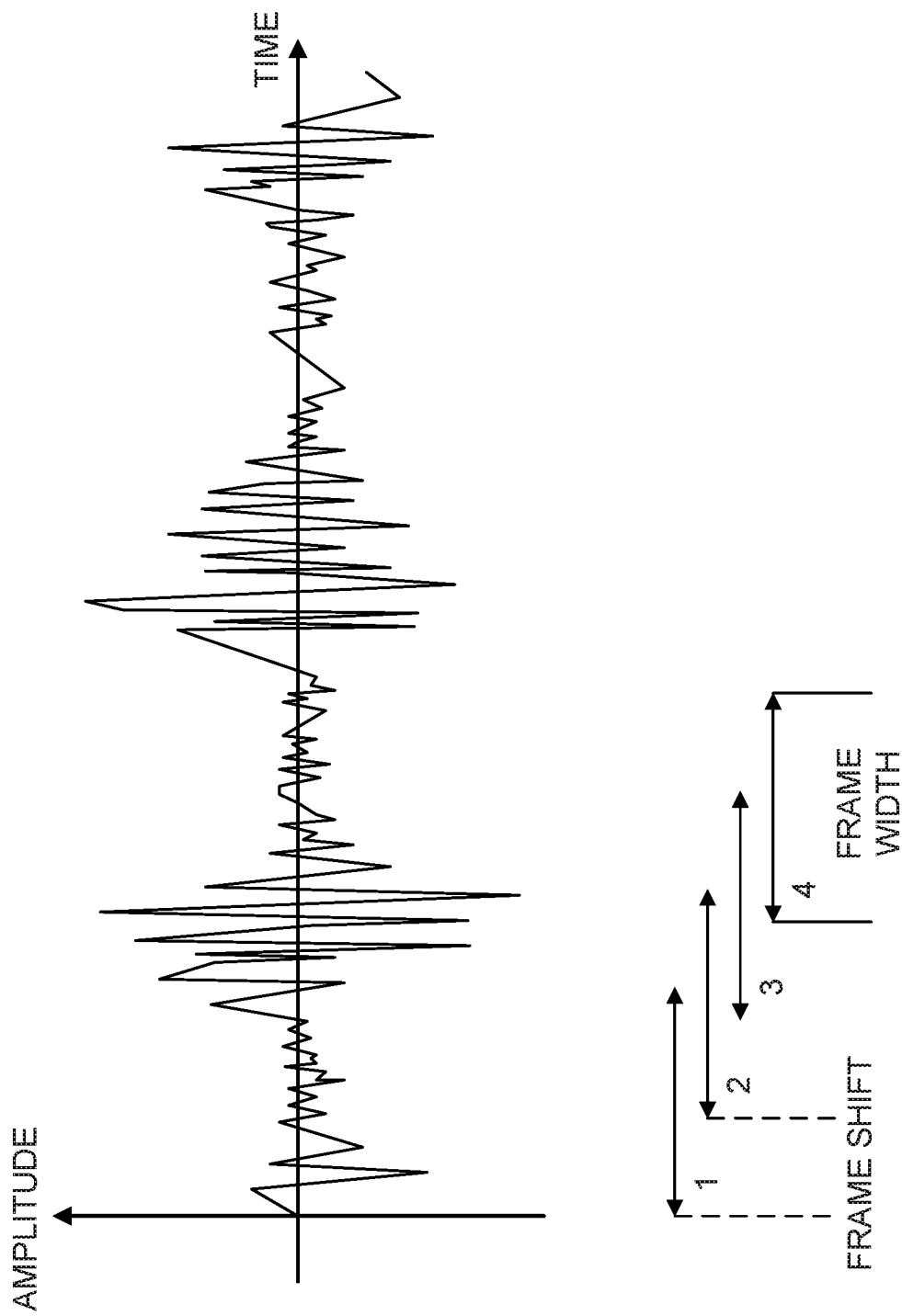
FIG. 11 illustrates extraction of feature quantities according to Embodiment 1 of the disclosure.

In contrast, if storage of any new speech data is determined (Step S31: Yes), the feature extractor 203 specifies speech data among the speech signals obtained at the microphones 21 that has the maximum amplitude, and then extracts feature quantities from the specified speech data (Step S32). In specific, with reference to FIG. 11, the feature extractor 203 acquires speech data in a processing frame having a certain width while shifting the processing frame by a certain frame shift, and extracts feature quantities from the speech data in each processing frame. Typical examples of the feature quantities are mel-frequency cepstral coefficients (MFCCs) containing a set of twelve values. The feature extractor 203 converts each set of twelve values into a twelve-dimensional feature vector, and acquires a feature vector sequence consisting of the feature vectors aligned in the chronological order of the frames. The feature extractor 203 outputs the feature vector sequence acquired from the speech signals to the likelihood calculator 207.

The likelihood calculator 207 then acquires the distance data indicating the distance to the user (speech source) from the distance determiner 201 (Step S33). The likelihood calculator 207 refers to the recognition target table 105 illustrated in FIG. 4A and specifies registered expressions as recognition targets based on the distance data (Step S34). For example, if the distance data indicates 7 m, the likelihood calculator 207 specifies only the three registered expressions associated with the distance range longer than 5.0 m and equal to or shorter than 10.0 m as recognition targets. In contrast, in the case of the distance data indicating 1 m, the likelihood calculator 207 specifies the registered expressions associated with the distance ranges of 0.5 to 1.5 m, 1.5 to 5.0 m, and 5.0 to 10.0 m as recognition targets.

The likelihood calculator 207 then selects one of the registered expressions specified as recognition targets (Step S35).

The likelihood calculator 207 refers to the recognition target table 105 illustrated in FIG. 4B to acquire the acoustic model of the selected registered expression, and then calculates a likelihood that the acquired acoustic model outputs a feature vector sequence O (sequence of feature vectors o) input from the feature extractor 203 (Step S36). In the example illustrated in FIG. 5, where the feature vector sequence O is represented by:

$$O=(o_1, o_2, o_3, o_4, o_5)$$

the probability P(O,M) that an acoustic model M outputs the feature vector sequence O is represented by:

$$P(O,M)=a_{12}b_2(o_1) \times a_{22}b_2(o_2) \times a_{23}b_2(o_3) \times \ldots$$

This probability equals the likelihood. It should be noted that $a_{ij}$ indicates the probability of transition from a state $S_i$ to a state $S_j$, $o_t$ indicates a t-th feature vector to be output with a certain probability at a state transition, and $b_j(o_t)$ indicates the probability of output of $o_t$ at the transition to the state $S_j$.

The likelihood calculator 207 then determines whether calculation of the likelihoods for all the registered expressions specified in Step S34 has been completed (Step S37). If the likelihood for any registered expression remains uncalculated (Step S37: No), the likelihood calculator 207 returns to Step S35 to select one of the unprocessed registered expressions and continues the same process. If determining completion of calculation of the likelihoods for all the registered expressions (Step S37: Yes), the likelihood calculator 207 compares the calculated likelihoods with each other and outputs one of the registered expressions that has the maximum likelihood equal to or higher than the threshold as the recognition result (Step S38). The process then returns to Step S31 and waits for input of a subsequent speech signal.

Figure 10:
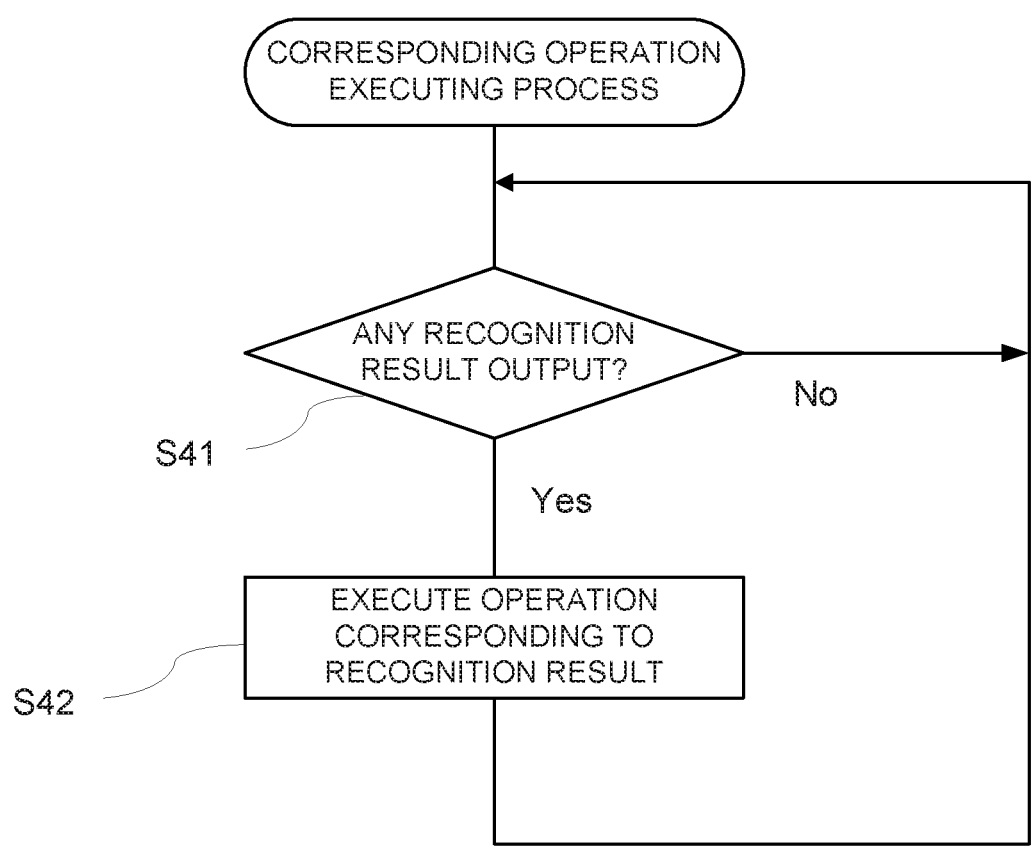
FIG. 10 is a flowchart of a corresponding operation executing process according to Embodiment 1 of the disclosure.

The driver 208 of the controller 100 continuously executes a corresponding operation executing process illustrated in FIG. 10 during the power-on state.

The driver 208 determines whether any recognition result is output from the speech recognizer 202 (Step S41). If determining no recognition result output (Step S41: No), the driver 208 returns to Step S41.

In contrast, if determining any recognition result output (Step S41: Yes), the driver 208 refers to the response data table 106, and drives the speaker 23 and the motors in the neck joint 31 and the legs 32 to perform an operation corresponding to the recognition result (Step S42).

The above-explained operations of the robot 1 are executed in parallel. These parallel operations allow the robot 1 to respond to speech from the user, in specific, to output a voice through the speaker 23, drive the neck joint 31 to face the user, or move toward the user. In the case of speech from a distant user, although most of the registered expressions are unrecognizable, some of the registered expressions expected to be used by distant users can be recognized with a lower possibility of mistaking the expression for other registered expression. Accordingly, the configuration can reduce the rate of false recognition due to background noise. This embodiment can thus provide a speech recognition device and a speech recognition method that can achieve a high successful recognition rate and provide a robot that can recognize voice commands at a high successful recognition rate regardless of background noise.

In this embodiment, the recognizable registered expressions are more limited as the distance between the robot 1 and the user increases, to thereby reduce the adverse effects of environmental noise. Alternatively, if the distance to the user is shorter than a predetermined distance, the registered expressions to be recognized for distant users may be excluded from the recognition targets. That is, the registered expressions expected to be used by distant users are not recognized in the case of the distance to the user shorter than the predetermined distance. This configuration can limit the recognizable registered expressions and thus reduces the rate of false recognition due to background noise.

In this embodiment, an operation corresponding to the recognition result is executed with reference to the response data table 106 if any recognition result output is determined. Alternatively, all the speech data from the microphones 21 may be subject to speech recognition based on the distance between the robot 1 and the user, and the operations corresponding to the recognition results may be executed by driving the speaker 23 and the motors in the neck joint 31 and the legs 32.

As described above, the recognition target table 105 is designed to vary the registered expressions for speech recognition in the speech recognition program 103 based on the distance to the speech source in this embodiment. That is, the recognition target table 105 is designed to adjust the easiness of recognition of each registered expression at the speech recognizer 202 based on the distance to the speech source.

(Embodiment 2)

Figure 12:
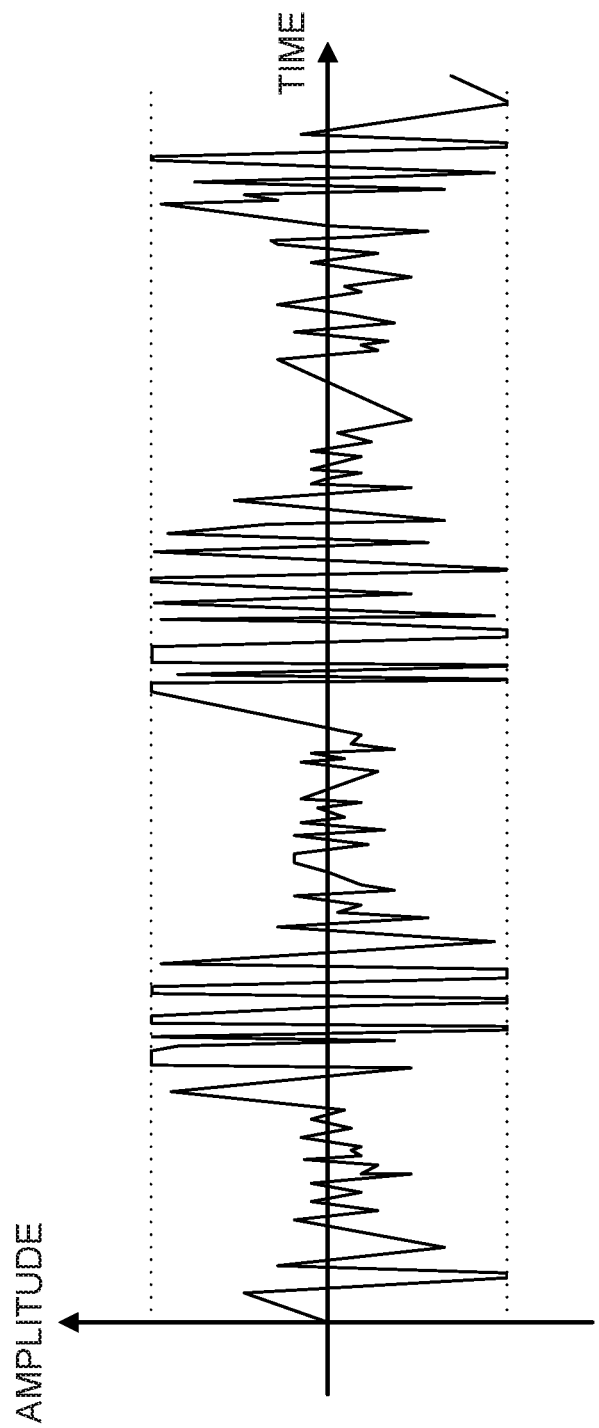
FIG. 12 illustrates clipping of an input speech signal according to Embodiment 2 of the disclosure.

Although the recognizable registered expressions are more limited as the distance to the user increases to thereby reduce the adverse effects of environmental noise in Embodiment 1, this configuration should not be construed to limit the disclosure. For example, in the case of a close user, clipping and distortion of speech data output from the microphones may occur as illustrated in FIG. 12, because of an excessively large volume of the speech collected at the microphones. In this case, speech recognition using many recognizable registered expressions would provide a low successful recognition rate. In the present embodiment, the number of recognizable registered expressions is limited even if the distance to the user is a predetermined distance or shorter, to thereby reduce the false recognition.

The robot 1 according to this embodiment is a small pet robot, for example, and assumes a relatively short distance to a user providing speech. The storage 101 stores a recognition target exclusion table 107 illustrated in FIG. 13, as well as the recognition target table 105. The recognition target exclusion table 107 is designed to exclude the registered expressions, such as "Come to me," from the recognition targets if the distance to the speech source is equal to or shorter than a predetermined distance (0.2 m in this example).

The recognition target exclusion table 107 defines a recognizable range of registered expressions such that a set of recognizable registered expressions associated with a second distance to the speech source is included in a set of recognizable registered expressions associated with a distance to the speech source longer than the second distance.

According to this embodiment, in Step S34 of the speech recognition process illustrated in FIG. 9, the registered expressions are specified as candidate recognition targets based on the distance data and the recognition target table 105 illustrated in FIG. 4A. Some registered expressions are then excluded from the specified registered expressions based on the distance data and the recognition target exclusion table 107 illustrated in FIG. 13, to ultimately determine recognizable registered expressions. For example, in the case of a distance to the speech source equal to or shorter than 0.2 m, although the recognition target table 105 defines all the registered expressions as recognition targets, the recognition target exclusion table 107 causes some registered expressions, such as "Come to me," to be excluded from the recognition targets. The registered expressions in the recognition target exclusion table 107 are, for example, ones expected to be used only by relatively distant users.

Although some registered expressions are excluded from the recognition targets in the case of a short distance to the speech source in this example, some registered expressions to be excluded from the recognition targets may be associated with each distance range among all the registered expressions.

As described above, the recognizable registered expressions are varied based on the distance between the robot 1 and the user to prevent a reduction in the successful speech recognition rate in Embodiment 2.

(Embodiment 3)

In the above embodiments, for distant users and close users, the number of recognizable registered expressions is limited, in other words, some of the registered expressions are excluded from the recognition targets.

In some cases, however, a distant user may provide loud speech to a robot using an expression that is often used by close users. If the robot completely ignores such speech from the user, this communication may differ from a natural conversation.

In the present embodiment, a weighting parameter indicating the easiness of recognition of each recognizable registered expression is varied based on the distance to a user, instead of exclusion of some registered expressions from the recognition targets.

The basic configuration of the robot 1 according to this embodiment is identical to that of Embodiment 1, except for the recognition target table 105 and the likelihood calculator 207.

The recognition target table 105 classifies the registered expressions into groups based on the expected distances of the user who uses the respective registered expressions as illustrated in FIG. 14A, and defines weighting parameters based on distance ranges for each group as illustrated in FIG. 14B. For example, if the distance L is 0.5 m, the registered expression "Look at me" in the intermediate-distance group will be provided with a weighting parameter of 2.

In Step S36 in FIG. 9, the likelihood calculator 207 calculates a likelihood for each registered expression, and then multiplies the likelihood by the weighting parameter corresponding to the distance L. The resulting product is hereinafter referred to as "corrected likelihood." The likelihood calculator 207 outputs one of the registered expressions that has the maximum corrected likelihood equal to or higher than a threshold as the recognition result. That is, the weighting parameters can control recognition priorities of the recognizable registered expressions based on the distance, and thus vary the recognizable registered expressions.

In specific, the following focuses on a first example where a user distant from the robot 1 by 7 m says "Kocchi-kite (Come to me)" to the robot 1. The registered expression "Kocchi-kite (Come to me)" belongs to the not-very-close group and is acoustically similar to the registered expression "Kocchi-mite (Look at me)" belonging to the intermediate-distance group. The distance data indicating 7 m provides a weighting parameter of 1 to the expression "Kocchi-kite (Come to me)" and a weighting parameter of 0.3 to the expression "Kocchi-mite (Look at me)." The expression "Kocchi-kite (Come to me)" thus tends to have a corrected likelihood higher than the expression "Kocchi-mite (Look at me)." This difference in corrected likelihoods leads to a reduction in false recognition between these two expressions.

The following focuses on a second example where the user distant from the robot 1 by 7 m says "tell me the weather" to the robot 1. In Embodiment 1, the expression "tell me the weather" is never recognized in the case of the distance of 7 m. In contrast, in Embodiment 3, the registered expression "tell me the weather" belongs to the intermediate-distance group and is provided with a weighting parameter of 0.3 by the distance data indicating 7 m. The expression "tell me the weather" is thus expected to have the maximum corrected likelihood on the conditions of few adverse effects of background noise and no other registered expression acoustically similar to the expression "tell me the weather." The expression "tell me the weather" can thus be recognized.

The classification and weighting of registered expressions based on their expected use distances can reduce the false recognition rate based on the distances, and does not eliminate the possibility of recognition of speech from a user who is in an unexpected distance.

Although the registered expressions are classified and then weighted based on their expected use distances in Embodiment 3, each of the registered expressions may be provided with a weighting parameter based on its expected use distance without classification. This modified configuration can also achieve the objective of Embodiment 3.

In this embodiment, the recognition target table 105 is designed to vary the registered expressions for speech recognition in the speech recognition program 103 based on the distance to the speech source as in the above embodiments. That is, the recognition target table 105 is designed to adjust the easiness of recognition of each registered expression at the speech recognizer 202 based on the distance to the speech source.

(Embodiment 4)

As described above, the recognizable registered expressions including a target registered expression and another registered expression acoustically similar to the target registered expression result in a reduction in the successful recognition rate. In order to solve this problem, the recognition target table should be designed such that the registered expression acoustically similar to the target registered expression is excluded from the recognition candidates based on the distance.

For example, in Embodiment 1 using the recognition target table 105 illustrated in FIGS. 4A and 4B, the registered expressions "Kocchi-mite (Look at me)" and "Chotto-chotto (Wait)" are included in the recognition candidates if the distance data indicates a distance equal to or shorter than 5.0 m. The registered expression "Kocchi-kite (Come to me)" that is used if the distance data indicates a distance longer than 5.0 m is acoustically similar to the expression "Kocchi-mite (Look at me)", whereas no other registered expression is acoustically similar to the expression "Chotto-chotto (Wait)." For example, in the case of the distance data indicating 7 m, the successful recognition rate of the registered expression "Kocchi-kite (Come to me)" is reduced if the recognition candidates include the expression "Kocchi-mite (Look at me)," but is not significantly reduced by the inclusion of the expression "Chotto-chotto (Wait)" in the recognition candidates. Accordingly, some registered expressions are excluded from the recognition candidates based on the existence of acoustically similar registered expressions in addition to formal classification of the registered expressions based on the distance. This configuration can ensure a sufficient successful recognition rate and a sufficient number of recognizable registered expressions.

In other words, the recognition target table 105 designed to maintain a first registered expression to be recognizable and switches a second registered expression acoustically similar to the first registered expression from a recognizable registered expression into an unrecognizable registered expression based on the distance to the speech source.

(Modification)

In a modification of the above four embodiments, calling expressions may be recognized with a higher priority in the case of no sound or substantially no sound around the robot 1.

Figure 15:
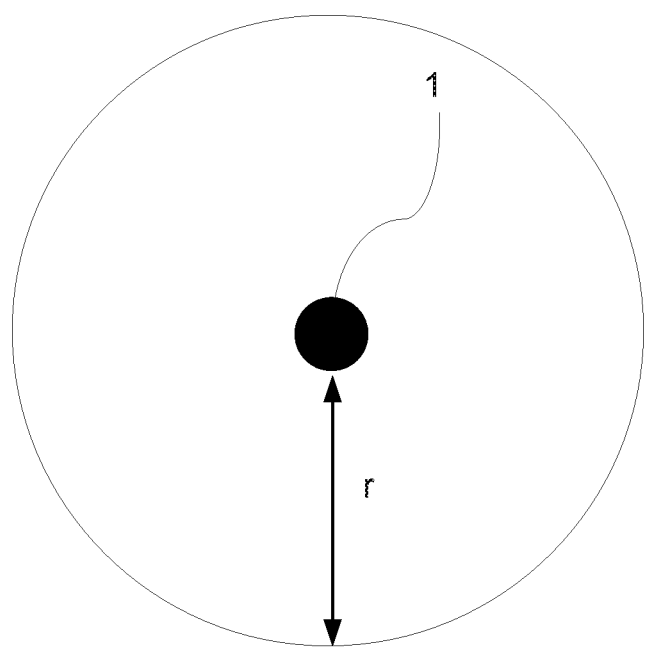
FIG. 15 illustrates an exemplary acoustic environment around a robot for varying the easiness of recognition of a registered expression.

For example, with reference to FIG. 15, the distance determiner 201 determines the position of the speech source in an area around the robot 1 based on a speech signal input from the microphones 21. If the speech recognizer 202 determines no speech source within a radius r around the robot 1, it can be assumed that no user exists near the robot 1 and the input speech is a calling expression from a distant user. In consideration of this respect, the easiness of recognition of each calling expression may be increased among the registered expressions in the recognition target table 105 if no user is determined within the radius r around the robot 1. For example, only the calling expressions may be specified as recognition targets. In specific, in Embodiment 3, the weighting parameters to be provided to the registered expressions belonging to the not-very-close group may be increased. Although the area around the robot 1 is represented by the circle having the radius r in this example, the area may have any other shape and size.

In another modification, a plurality of speech recognition engines may be available in the speech recognition program 103. In this case, the optimum one of the speech recognition engines may be selected for speech recognition based on the distance data obtained at the distance determiner 201. In general, a user distant from the robot 1 often provides a word or short phrase to the robot 1, whereas a user close to the robot 1 often provides a long phrase. This tendency is reflected in the recognition target table 105 illustrated in FIGS. 4A and 4B. Accordingly, with reference to FIG. 16, a speech recognition engine for words is used for speech recognition in the case of the distance data indicating 1.5 m or longer, whereas a speech recognition engine for phrases is used in the case of the distance data indicating a distance shorter than 1.5 m. This configuration can increase the successful recognition rate.

The four embodiments of the disclosure and their modifications are illustrated as above. In each of the embodiments, registered expressions to be recognized are inferred from the distance data indicating the distance between the robot 1 and the user and the parameters associated with the registered expressions, to thereby increase the successful speech recognition rate. In Embodiments 1 and 2, the registered expressions used by the likelihood calculator 207 are varied or the set of recognizable registered expressions is varied based on the distance data. The registered expressions to be recognized are thus inferred from the distance data and the parameters. In Embodiment 3, the weighting parameters used in multiplication at the likelihood calculator 207 vary based on the distance data. The registered expressions to be recognized are thus inferred from the distance data and the parameters.

For example, although the recognizable registered expressions are switched between four levels in Embodiment 1, the number of levels may be any other number, such as two or ten. Although a single recognition target table is used to limit the recognizable registered expressions based on the distance in Embodiment 1, the limitation of the recognizable registered expressions is not necessarily based on a single table. For example, a plurality of recognition target tables may be available and one of the tables may be selected based on the distance.

In Embodiment 1, the recognizable registered expressions are limited as the distance to the user increases, to thereby reduce the adverse effects of environmental noise. In Embodiment 3, the registered expressions are classified and then weighted based on their expected use distances. These separate configurations may be combined in the recognition of the registered expressions, to thereby reduce the rate of false recognition due to background noise.

Furthermore, in Embodiment 1, the speech recognition is not executed when the distance L from the robot 1 to the speech source is longer than 10 m. Here, by the controller 100 controlling the legs 32, the robot 1 may be moved to be within a range that allows the speech recognition. In other words, when the speech recognizer 202 fails to recognize the speech signal, the robot 1 may move based on the distance L determined by the distance determiner 201 and the distance range associated with recognizable registered expressions in the recognition target table 105.

The above embodiments and their modifications should not be construed to limit the technical scope of the disclosure and may be modified in various manners. For example, the distance to the speech source may be determined as the focal distance obtained by the auto-focus function of the camera 22 or determined with a laser range finder included in the sensors 24, instead of being determined by the position determining process on the speech signals obtained at the microphones 21. It should be noted that the determination of the distance between the robot and the user does not require high accuracy. The distance data only has to be accurate enough to determine parameters provided to the registered expressions.

Although the speech recognition device and the speech recognition method are used for inputting commands into a robot in the above embodiments, these device and method may be used independently from other apparatus. Alternatively, the device and method may be used for inputting commands into any machine, computer, or communication device, other than the robot.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A speech recognition device comprising:
a processor configured to:
   determine a distance to a speech source;
   specify one or more of a plurality of registered expressions to be recognizable based on the distance determined,
      wherein specifying the one or more of the plurality of registered expressions to be recognizable based on the distance determined comprises:
         maintaining a first registered expression to be recognizable; and
         switching a second registered expression from a recognizable registered expression into an unrecognizable registered expression based on the distance determined, wherein the second registered expression is acoustically similar to the first registered expression; and
   recognize a speech signal based on the one or more of the plurality of registered expressions specified as recognizable.

2. The speech recognition device according to claim 1, wherein the processor is configured to vary the one or more of the plurality of registered expressions specified to be recognizable such that the number of the one or more of the plurality of registered expressions specified to be recognizable increases as the distance determined decreases.

3. The speech recognition device according to claim 1, wherein the processor is configured to specify the one or more of the plurality of registered expressions to be recognizable such that a set of recognizable registered expressions if the distance determined is a first distance is included in a set of recognizable registered expressions if the distance determined is shorter than the first distance.

4. The speech recognition device according to claim 1, wherein the processor is configured to specify the one or more of the plurality of registered expressions to be recognizable such that a set of recognizable registered expressions if the distance determined is a second distance is included in a set of recognizable registered expressions if the distance determined is longer than the second distance.

5. The speech recognition device according to claim 1, wherein the processor is configured to specify at least one of the plurality of registered expressions to be recognizable regardless of the distance determined.

6. The speech recognition device according to claim 1, wherein the processor is configured to:
   provide a weighting parameter to each of the one or more of the plurality of registered expressions specified to be recognizable based on the distance determined, wherein the weighting parameter indicates an easiness of recognition of the each of the one or more of the plurality of registered expressions specified to be recognizable; and
   recognize a speech signal based on the weighting parameter provided to the each of the one or more of the plurality of registered expressions specified as recognizable.

7. The speech recognition device according to claim 1, wherein the processor is configured to:
   extract feature quantities from the speech signal; and
   recognize (i) the speech signal based on the feature quantities extracted, and (ii) a speech data on the one or more of the plurality of registered expressions specified to be recognizable.

8. The speech recognition device according to claim 7, wherein the feature quantities extracted comprise a feature vector sequence.

9. The speech recognition device according to claim 8, wherein the processor is configured to:
   calculate a likelihood that each of the recognizable registered expressions outputs the feature vector sequence included in the feature quantities extracted; and
   recognize the speech signal based on the likelihood calculated.

10. The speech recognition device according to claim 9, wherein the processor is configured to calculate the likelihood by performing multiplication of a probability of transition from one state into a subsequent state by probabilities of output of a feature vector included in the feature vector sequence at the transition and in the subsequent state and repeating the multiplication for the entire feature vector sequence.

11. The speech recognition device according to claim 1, further comprising:
a microphone configured to:
   receive environmental sound; and
   output the speech signal based on the environmental sound received to the processor.

12. The speech recognition device according to claim 1, wherein the processor is configured to associate the one or more of the plurality of registered expressions specified to be recognizable with a predetermined distance range.

13. A robot comprising:
one or more controllable moving mechanism; and
a processor configured to:
   determine a distance to a speech source;
   specify one or more of a plurality of registered expressions to be recognizable based on the distance determined,
      wherein the one or more of the registered expressions specified are associated with a predetermined distance range;
   attempt to recognize a speech signal based on the one or more of the plurality of registered expressions specified as recognizable; and
   in response to failing to recognize the speech signal, control the one or more controllable moving mechanism to move the robot based on the distance determined and the predetermined distance range.

14. A speech recognition method comprising:
determining a distance to a speech source;
specifying one or more of a plurality of registered expressions to be recognizable based on the distance determined,
   wherein specifying the one or more of the plurality of registered expressions to be recognizable based on the distance determined comprises:
      maintaining a first registered expression to be recognizable; and
      switching a second registered expression from a recognizable registered expression into an unrecognizable registered expression based on the distance determined, wherein the second registered expression is acoustically similar to the first registered expression; and
recognizing a speech signal based on the one or more of the plurality of registered expressions specified as recognizable.

15. A non-transitory computer-readable recording medium having stored thereon a program executable by a computer, the program controlling the computer to perform functions comprising:
    determining a distance to a speech source;
    specifying one or more of a plurality of registered expressions to be recognizable based on the distance determined,
        wherein specifying the one or more of the plurality of registered expressions to be recognizable based on the distance determined comprises:
            maintaining a first registered expression to be recognizable; and
            switching a second registered expression from a recognizable registered expression into an unrecognizable registered expression based on the distance determined, wherein the second registered expression is acoustically similar to the first registered expression; and
    recognizing a speech signal based on the one or more of the plurality of registered expressions specified as recognizable.

16. The non-transitory computer-readable recording medium according to claim 15,
    wherein the program controls the computer to recognize the speech signal with a speech recognition engine, the speech recognition engine being selected from a plurality of speech recognition engines based on the distance determined.

17. A speech recognition device comprising:
    a processor configured to:
        determine a distance to a speech source;
        specify one or more of a plurality of registered expressions to be recognizable based on the distance determined;
        provide a weighting parameter to each of the one or more of the plurality of registered expressions specified to be recognizable based on the distance determined, wherein the weighting parameter indicates an easiness of recognition of the each of the one or more of the plurality of registered expressions specified to be recognizable; and
        recognize a speech signal based on the weighting parameter provided to the each of the one or more of the plurality of registered expressions specified as recognizable.

18. A speech recognition method comprising:
    determining a distance to a speech source;
    specifying one or more of a plurality of registered expressions to be recognizable based on the distance determined;
    providing a weighting parameter to each of the one or more of the plurality of registered expressions specified to be recognizable based on the distance determined, wherein the weighting parameter indicates an easiness of recognition of the each of the one or more of the plurality of registered expressions specified to be recognizable; and
    recognizing a speech signal based on the weighting parameter provided to the each of the one or more of the plurality of registered expressions specified as recognizable.

19. A non-transitory computer-readable recording medium having stored thereon a program executable by a computer, the program controlling the computer to perform functions comprising:
    determining a distance to a speech source;
    specifying one or more of a plurality of registered expressions to be recognizable based on the distance determined;
    providing a weighting parameter to each of the one or more of the plurality of registered expressions specified to be recognizable based on the distance determined, wherein the weighting parameter indicates an easiness of recognition of the each of the one or more of the plurality of registered expressions specified to be recognizable; and
    recognizing a speech signal based on the weighting parameter provided to the each of the one or more of the plurality of registered expressions specified as recognizable.

20. The speech recognition device according to claim 1,
    wherein a number of the one or more of the plurality of registered expressions specified to be recognizable decreases as the distance determined increases.

* * * * *